Aug. 4, 1959   J. S. SCHLOTTHAUER ET AL   2,897,918
SEPARATION OF HALIDES
Filed July 2, 1957

*INVENTORS.*
Joseph S. Schlotthauer
Linden E. Snyder
Leland R. Lyons
BY
Agent

United States Patent Office 2,897,918
Patented Aug. 4, 1959

2,897,918

SEPARATION OF HALIDES

Joseph S. Schlotthauer, Henderson, Linden E. Snyder, Las Vegas, and Leland R. Lyons, Boulder City, Nev., assignors to Titanium Metals Corporation of America, New York, N.Y., a corporation of Delaware Application July 2, 1957, Serial No. 669,672

4 Claims. (Cl. 183—119)

This invention relates to a method of separating halides, and more particularly to a method for separating iron chloride from its hot gaseous admixture with other gases, including titanium tetrachloride.

Production of titanium tetrachloride is most often accomplished by chlorination of a mixture of a titanium bearing ore and carbon at elevated temperature. Ilmenite or rutile are generally employed as the titanium bearing material, and in the case where ilmenite is employed, the hot product gases from the chlorinator inevitably contain a substantial percentage of iron chloride. Separation of iron chloride is generally the first step in the purification of the chlorinator product gases to produce the desired titanium tetrachloride. Separation of iron chloride is difficult, however, due to its peculiar characteristics in part resulting from the fact that it does not always condense from a gas to a liquid and then to a solid, but may sublime directly from the gaseous phase to a solid. Previous processes for separating iron chloride from a hot gas mixture with titanium tetrachloride have been difficult to practice on a commercial scale. If any titanium tetrachloride is condensed with the iron chloride, a sticky or hard mixture is obtained which quickly forms on the interior of pipe lines and condenser surfaces causing serious pluggages in the equipment. Condensation of iron chloride alone on various types of condenser surfaces generally results in deposition of a firm, hard layer which inhibits heat transfer and is difficult to remove and handle. If the iron chloride is condensed substantially in the vapor phase, it will remain in the gas stream as a finely-divided smoke or fog which involves additional difficult separation problems before the vapor containing titanium tetrachloride can be effectively purified from this substance.

It is a principal object of this invention to produce an improved process for separating iron chloride from a hot gaseous mixture of iron chloride and other gases, including titanium tetrachloride. Another object of this invention is to provide a process for separating iron chloride from its hot admixture with other gases to produce a purified residual gas containing substantially no suspended particles of iron chloride. A still further object of this invention is to provide a method for separation of iron chloride from its hot admixture with other gases in which a simple and non-expensive condensing medium is employed which can be continuously reused in the process. These and other objects of this invention will be apparent from the following more complete description thereof.

This invention, in its broadest aspects, contemplates the separation of iron chloride from a hot gaseous mixture of iron chloride and other gases, including titanium tetrachloride, by introducing such gases into a moving column of pebbles and condensing iron chloride on the surfaces of such pebbles. The gases are effectively stripped of iron chloride, and the iron chloride coated pebbles are treated by mechanical means to separate crystalline iron chloride powder. The pebbles are cooled and recycled back to the column for condensation and contact with additional hot gases.

The term "iron chloride," as herein employed, is intended to include ferric chloride, ferrous chloride, and mixtures of these compounds. The term "pebbles," as herein employed, refers to small pebble-like solid material which will be substantially inert to the constituents of the hot gases with which it comes in contact. The pebbles may be uniform or irregular in size, generally ranging from one-eighth inch to one inch in diameter and preferably, for most efficient action and ease of handling, between one-quarter inch and one-half inch. The pebbles may be of any suitable material inert to the gases and having sufficient surface area for effective condensation. They may be of alumina, silica, pumice or other natural occurring rock or, if desired, may be balls, for instance, of iron or nickel, or of glass, coke or other suitable material, as will be obvious to those skilled in the art. Naturally occurring volcanic cinder and metallurgical coke are particularly useful due to their availability and low cost. By the term "cooled," as employed herein, is meant cooled to a temperature sufficiently below the temperature of the incoming hot gases so as to produce an effective condensation action of the ferric chloride content. It is important, however, that the pebbles are not cooled to below the condensation temperature of titanium tetrachloride, which is desired to be still in the vapor phase in the exit gases.

A better understanding of the nature of the process of this invention may be obtained by reference to the annexed drawing in which.

Figure 1:
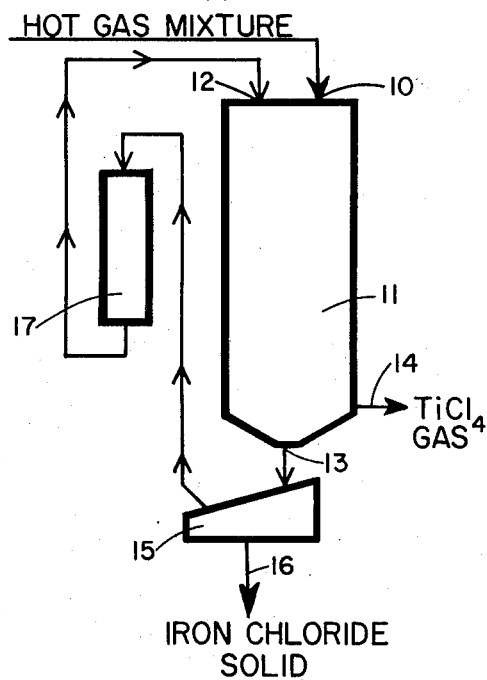
Fig. 1 shows an embodiment of this invention in which the hot gaseous mixture is passed co-currently in contact with the pebble condensing medium.
Figure 3:
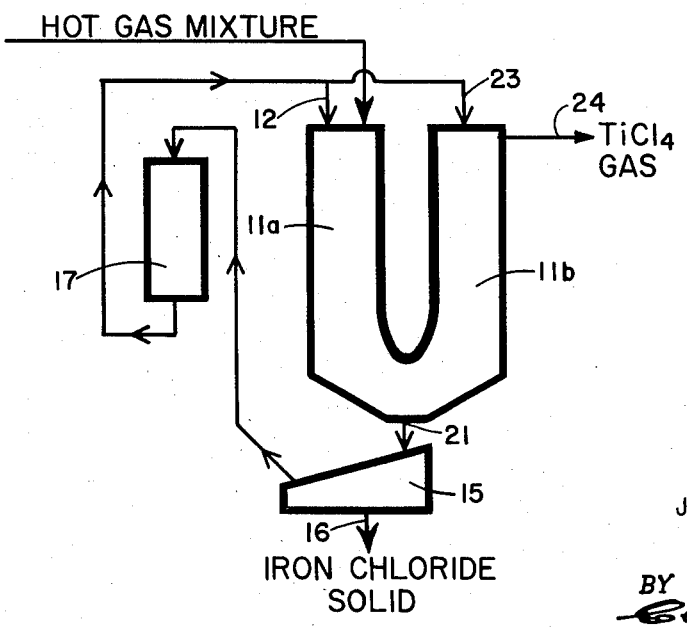

Fig. 3 illustrates an embodiment of this invention in which the hot gases pass first co-currently and then countercurrently to the direction of flow of the pebble condensing medium. Referring particularly to Fig. 1, the hot gases entering as at 10 may comprise $FeCl_2$, $FeCl_3$, $TiCl_4$, $CO_2$, CO and trace amounts of other gases. The precise composition of the gas mixture will largely depend on the type of raw material being treated and the chlorination conditions. The gases on withdrawal from the chlorinator will most generally be at an elevated temperature somewhere between 500° and 800° C. The pebble condensing medium is introduced in the moving contact column 11 as at 12. The pebbles entering at 12, and the interior and contents of the contact column 11 must at all times be above the condensation temperature of $TiCl_4$, which may be, depending on the composition of the gases, somewhere between 90° C. and 115° C. The pebbles enter as at 12 and flow in a downwardly moving column 11 and are discharged from this column at 13. During their passage downwardly through column 11 they become coated with crystalline iron chloride condensed from the gaseous mixture which is flowing co-current to the pebble flow. At or near the base of the column 11 the residual gases, which will now contain substantially no iron chloride, are withdrawn as at 14. The coated pebbles are transferred to a device for mechanically separating the condensed iron chloride from their surfaces. Due to the conditions prevailing in the contact column 11, the iron chloride will adhere or become associated with the pebbles so that the stripped gases containing gaseous $TiCl_4$ removed at 14 will be essentially free from iron chloride, even as suspended fine particles. The adhesion of the iron chloride to the pebble surfaces is not so great however that it cannot be readily separated by mechanical means such as, for example, a simple vibrating screen represented at 15. The screen should be provided with openings smaller than the diameter of the pebbles, and a shaking action will cause the pebbles to be rapidly freed of almost all the iron chloride. The iron chloride is withdrawn from the shaker screen apparatus as at 16, and the pebbles are then passed through a cooler 17 and recycled back to the contact column at 12.

Figure 2:
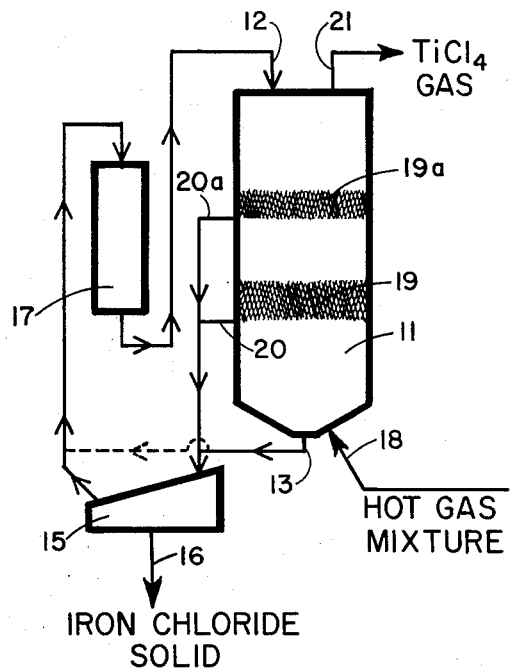
Fig. 2 illustrates an embodiment of this invention in which the hot gases are passed countercurrently to the flow of the pebble condensing medium.

In another embodiment of this invention, illustrated in Fig. 2, the hot gaseous mixture is passed countercurrent to the flow of the pebbles in contact column 11. In this embodiment the hot gases are introduced at 18 in the bottom of the column and the stripped gases are withdrawn at 21 from the top of the column. Cooled pebbles are supplied, as in the embodiment illustrated in Fig. 1, at 12 in the top of the column thus passing downwardly and countercurrently to the upward flow of gases with which they are contacted. Since the temperature of the hot gases entering at 18 is considerably above the condensation temperature of iron chloride, the pebbles withdrawn from the bottom of the column at 13 will not be coated with iron chloride since this will be revolatilized by the hot incoming gases. It will be found that due to the temperature gradient existing in the contact column 11 that iron chloride will be condensed effectively at some intermediate point or points between the top and bottom, for example, in the embodiment illustrated, at 19. A side arm discharge for coated pebbles is therefore provided in the vicinity of, preferably near the lower portion of, the condensation zone 19, and the coated pebbles are removed as at 20 and passed over the screen 15 to separate iron chloride at 16. If the gases treated contain both $FeCl_2$ and $FeCl_3$ and the proportions of these constituents and the characteristics of the condensing apparatus are such that individual condensing zones may result, the $FeCl_3$ may condense in an upper zone as at 19a while $FeCl_2$ will condense at 19. Under these conditions an additional side arm discharge to remove $FeCl_3$ coated pebbles at 20a may be provided and these may be combined with the discharge at 20 when separation of the iron chloride into individual compounds is not necessary or desirable. The pebbles withdrawn at 13 may be cooled directly (as shown in dotted lines) or may be also passed over the screening apparatus 15, combined with the cleaned pebbles and transferred to the cooler 17 and subsequently back into the top of the column at 12, as shown. Stripped gas containing gaseous $TiCl_4$ but substantially free from iron chloride is withdrawn from the top of the column 11 as at 21.

In the embodiment illustrated in Fig. 3, the advantages of both co-current and countercurrent operation of the contact column are obtained. In this embodiment two downwardly flowing columns, 11a and 11b, of cooled pebbles are employed which meet at a common junction and discharging exit at 21. The hot gaseous mixture is fed into the top of column 11a at 10 as in Example 1, and the gases in the column flow co-current to the condensing pebbles.

When the iron chloride consists essentially of either ferric or ferrous chloride, the flow of gases and amount of flow of pebbles is preferably arranged so that substantially no condensation of iron chloride occurs in this column. Its function, in effect, as a precooler is to produce in the vicinity of the junction area of the two columns at their bases, a cooled gas mixture having a temperature slightly above the temperature at which iron chloride will condense from such gas mixture and preferably not more than 30° C. above such temperature. The gases pass downwardly through column 11a and then pass upwardly through column 11b, which is also formed of downwardly moving cooled pebbles introduced as at 23 in the top of the column. The iron chloride is effectively condensed on the surfaces of descending pebbles in column 11b, and the stripped gases containing gaseous $TiCl_4$ but essentially no iron chloride are withdrawn from the top of this column as at 24. The hot gases, being precooled during the passage downward through column 11a, will not cause revolatilization of the iron chloride coating on the pebbles descending in column 11b, and the combined pebbles from both columns are withdrawn at 21 and passed over the separating device at 15 and subsequently passed through the cooler 17 and returned to the top of the individual columns as at 10 and 23. Separated iron chloride is removed at 16.

When the iron chloride in the gases treated according to the embodiment illustrated in Fig. 3 consists of a mixture of $FeCl_2$ and $FeCl_3$, operation is preferably arranged so that ferrous chloride is condensed in column 11a and ferric chloride in column 11b. The gas temperature in the vicinity of the junction area of the two columns should be just above the condensation temperature of ferric chloride, preferably not more than 30° C. above such temperature. Under these conditions the column 11a separates ferrous chloride and also precools the gas mixture so that efficient separation of $FeCl_3$ may be obtained in column 11b.

It will be apparent that the pebble streams in the embodiment shown in Fig. 2 may, if desired, be separately handled and cooled, and only those pebbles having a condensed layer of iron chloride need be screened. In the embodiment shown in Fig. 3 the pebbles in columns 11a and 11b may be separately withdrawn and in like manner only the iron chloride coated pebbles need be screened, or the discharge streams may be individually screened to produce separated $FeCl_2$ and $FeCl_3$ by-products.

Other methods of contacting the hot gas mixture with the pebbles may be employed, for instance, a horizontal flow of gas through a descending column of pebbles may be arranged and will prove effective and desirable under certain conditions.

The condensation temperatures of ferric and ferrous chlorides, and also that of titanium tetrachloride, in the gas mixture employed in the practice of this invention will depend at least in part on the proportions of various constituents of the gas mixture. In Table I below is shown the condensation temperature at atmospheric pressure of such compounds from several gas mixture compositions.

The other gases will comprise CO, $CO_2$ and incidental amounts of $N_2$, air, and various gaseous impurities.

TABLE I

| Composition | Gas Mixture | | | | |
| --- | --- | --- | --- | --- | --- |
| | A | B | C | D | E |
| $FeCl_2$ (parts by volume) | trace | trace | 41 | 7 | 18 |
| $FeCl_3$ | 19 | 48 | 2 | 10 | trace |
| $TiCl_4$ | 31 | 14 | 18 | 28 | 30 |
| Other gases | 58 | 80 | 60 | 52 | 55 |
| Condensation Temperature: | | | | | |
| $FeCl_2$ (Degrees C) | | | 920 | 795 | 865 |
| $FeCl_3$ | 267 | 280 | 236 | 259 | |
| $TiCl_4$ | 99 | 74 | 86 | 99 | 99 |

The apparatus employed in the practice of this invention may be of conventional design adapted to provide required operating conditions, as will be apparent to those skilled in the art. The chamber for contacting the pebbles with the gas mixture would preferably be of elongated tubular form and lined with material which will be resistant to attack by corrosive elements in contact therewith. The contact chamber should be constructed to have required thermal characteristics, and may be provided with heating or cooling means to insure correct operating temperatures and effective condensation of iron chloride. The required flow of pebbles is arranged and controlled by conventional apparatus. Moving belts, suitable conveyors or other adaptable handling means may be employed, and the pebbles moving downwardly through the contact chamber should be arranged to provide a relatively loosely packed column, generally motivated by gravity with the lower output controlled so that required contact time is obtained considering the throughput flow of the gas mixture being treated. The pebble cooler may be of any conventional or designed type and is required to simply abstract sufficient heat from the pebbles so that they may be recycled to the top of the contact column at a temperature sufficiently below the condensation temperature of iron chloride. This may be accomplished, for example, by passing the pebbles through an auxiliary chamber having water cooled walls or by conveying the pebbles through a cooled section of the conveying apparatus or by passing through or over the pebbles during transport sufficient cooling medium such as air.

The means employed for separation of the iron chloride from the pebbles after these have been discharged from the contact column are mechanical. Since the iron chloride is condensed as relatively loosely adhering and cohering crystals, it may be readily dislodged by action such as agitation or shaking, and the pebbles and iron chloride separated conveniently as by screening. The mechanical action and separation may be provided in combination by a simple vibrating shaker screen. The screen mesh size, of course, should be such that the iron chloride particles will readily pass through, and the pebbles be retained on the screen surface. Alternatively, a rotating drum screen through which the coated pebbles are continuously passed and which will provide tumbling action to dislodge iron chloride crystals from the pebble surfaces may be employed. It will be apparent that other mechanical separating means which will accomplish the dislodgement and separation of the iron chloride crystals can be used.

The following examples will illustrate selected embodiments of the practice of this invention.

Example 1

A gas mixture containing by volume a trace of $FeCl_2$, 19 parts of $FeCl_3$, 31 parts of $TiCl_3$ and 58 parts of other gases was treated according to the embodiment of this invention illustrated in the drawing in Fig. 1. The contact chamber was in the form of a vertical tube, one foot in diameter and ten feet high lined with refractory brick. The gas mixture was introduced at the top of this chamber at a rate of 41 cubic feet per minute, and at the entry point was at a temperature of 700° C. Also introduced at the top of the contact chamber were pebbles of average one-quarter inch size of volcanic cinder, and which formed in the contact chamber a relatively loosely packed contact column. The pebbles were introduce at a temperature of 120° C. and at a rate of 1100 pounds per hour to form a column in the contact chamber which moved downwardly at the rate of 32 feet per hour.

The flow of gas mixture and the flow of cooled pebbles into the top of the contact chamber was such that substantially all the ferric chloride was condensed on the surfaces of the pebbles, and at the same time the gas temperature inside the contact chamber was always above 200° C. The gases containing $TiCl_4$ were withdrawn at the bottom of the contact chamber and showed only a trace of ferric chloride, indicating efficient condensation and separation of this compound from the gas mixture. Also from the bottom of the contact chamber were withdrawn the pebbles now coated with loosely adhering crystals of ferric chloride. These were passed over a 10 mesh screen having openings of $1/16$ inch and which was vibrated at a frequency of 600 cycles per minute. The vibrating action effectively dislodged the ferric chloride crystals and separated them from the pebbles, and this material passed through the screen and was collected in a chamber below. The pebbles, after having been freed of ferric chloride, were then conveyed to a cooling chamber which comprised a vertical tube one foot in diameter and ten feet long provided with water cooled walls through which the pebbles were caused to flow downwardly. The flow of cooling water around the walls of the cooling chamber was adjusted so that the pebbles were withdrawn from the cooler at a temperature of 120° C. and they were subsequently transferred substantially at this temperature back into the top of the contact chamber to be reused to precipitate additional ferric chloride from the continuously introduced hot gas mixture.

Example 2

A gas mixture containing by volume, 18 parts $FeCl_2$, a trace of $FeCl_3$, 30 parts of $TiCl_4$ and 55 parts of other gases, was introduced at a rate of 41 cubic feet per minute into the bottom of a contact chamber of dimensions similar to those described in Example 1. The temperature of the introduced gas mixture was about 950° C. Cooled pebbles were introduced at a temperature of 120° C. into the top of this chamber to form a contact column of pebbles moving downwardly and countercurrently to the upward flow of gases being treated. About one-quarter of the distance from the bottom of the contact chamber a side outlet arm was provided. The contact arm enabled pebbles coated with $FeCl_2$ to be removed from the contact column at this position in this column, where the condensation of ferrous chloride occurred. Since the incoming hot gases would heat the pebbles being withdrawn at the bottom of the column to a temperature above the condensation temperature of ferrous chloride, the actual condensation occurred, under the conditions of flow recited, in the zone about one-quarter of the distance from the bottom, to which the side arm outlet was provided. The side arm was arranged to remove about two-thirds of the pebbles, the remaining one-third staying in the contact chamber and were discharged at the bottom thereof. The coated pebbles withdrawn from the side arm outlet were passed over a shaker screen similar to that described in Example 1. The remaining pebbles withdrawn from the bottom of the contact chamber and which were not coated with ferrous chloride were combined with the cleaned side arm pebbles, passed through a cooler and reintroduced at a temperature of about 120° C. to the top of the contact chamber. The gas containing $TiCl_4$ was withdrawn from the top of the column and was substantially free from $FeCl_2$.

Example 3

Apparatus as illustrated in Fig. 3 was employed, each contact chamber being six inches in diameter and ten feet long, meeting at the bottom to form a generally U-shaped system. Pebbles of one-half inch size metallurgical coke were introduced into the top of both chambers and withdrawn as a combined stream at the bottom. The left hand column flowed downwardly at a rate of 30 feet per hour and the right hand column at a rate of 30 feet per hour. The coke pebbles were introduced at a temperature of about 150° C. Mixed gases at a temperature of 900° C. were introduced into the top of the left hand column at a rate of 41 cubic feet per hour. The gases contained by volume 7 parts $FeCl_2$, 10 parts $FeCl_3$, 28 parts $TiCl_4$ and 52 parts other gases.

At the bottom of the left hand column the gases had been cooled by contact with the pebble in that column to a temperature of 270° C. The $FeCl_2$ content of the gases was condensed by the pebbles in this leg. The gases then passed upwardly through the downwardly moving column in the right hand contact chamber where $FeCl_3$ was condensed on the pebbles and the stripped gases were withdrawn from the top of this chamber at a temperature of 150° C. and were free of iron chloride (both $FeCl_2$ and $FeCl_3$).

The pebbles discharged from the bottom of the contact columns were passed through a slowly rotating trommel screen having openings $1/8$ inch diameter and iron chloride effectively separated from the pebbles. The cleaned pebbles were conveyed back to the top of the contact chambers and at an intermediate point in the conveyor were cooled with a blast of air to a temperature of 150° C. at which temperature they were reintroduced into the tops of the two contact chambers.

*Example 4*

Apparatus as illustrated in Fig. 3 was employed, the left hand contact chamber being 5 inches in diameter and 10 feet long and the right hand contact chamber being 7 inches in diameter and 10 feet long with both contact chambers meeting at the bottom to form a generally U-shaped system. Pebbles of ½ inch size metallurgical coke were introduced into the top of both chambers and withdrawn as a combined stream at the bottom. The left hand column flowed downwardly at a rate of 28 feet per hour and the right hand column at a rate of 65 feet per hour. The coke pebbles were introduced at a temperature of about 140° C. Mixed gases at a temperature of 750° C. were introduced into the top of the left hand column at a rate of 40 cubic feet per hour. The gases contained by volume a trace of $FeCl_2$, 48 parts $FeCl_3$, 14 parts $TiCl_4$ and 80 parts other gases.

At the bottom of the left hand column, the gases had been cooled by contact with the pebbles in that column to a temperature of 300° C. The gases then passed upwardly through the downwardly moving column in the right hand contact chamber where $FeCl_3$ was condensed on the pebbles and the stripped gases were withdrawn from the top of this chamber at a temperature of 140° C. and were free of iron chloride.

The pebbles discharged from the bottom of the contact columns were passed over a vibrating screen as in Example 1 and the ferric chloride effectively separated from the pebbles. The cleaned pebbles were conveyed back to the top of the contact chambers and at an intermediate point in the conveyor were cooled with a blast of air to a temperature of 140° C. at which temperature they were reintroduced into the tops of the two contact chambers.

The efficient operation of the process of this invention depends apparently upon the unique manner in which iron chloride is condensed on the surfaces of the pebbles employed as a condensation medium. Under the conditions recited the iron chloride precipitates as a crystalline mass on the pebble surfaces from which it may readily be removed by mechanical means such as a simple shaker screen. Since the temperature of the system is maintained at all points above the condensation temperature of $TiCl_4$, no sticky, gummy precipitates are formed. Due apparently to the heat transfer characteristics of the column of pebbles, the condensed iron chloride is not hard and dense but is sufficiently adhesive and cohesive to prevent fines from appearing in the stripped gases as suspended particles or smoke, yet the adhesion is not so great that the iron chloride cannot readily be separated from the pebbles so that they may be cleaned and recycled for further use. It may be found that the separating operation may not be effective to remove 100% of the iron chloride coating, particularly in initial operation of the process. Any residual iron chloride remaining on the pebble surfaces will not cause harm, however, and after a certain period of recycling, a more or less permanent layer will form and the pebble sizes and surfaces will become stabilized in this condition.

This application is a continuation-in-part of our application Serial No. 585,896, filed May 18, 1956, now abandoned.

We claim:

1. A method for the separation of $FeCl_3$ from a hot gaseous mixture of $FeCl_3$ and other gases including $TiCl_4$ which comprises; introducing pebbles of inert material cooled to a temperature above the condensation temperature of $TiCl_4$ into the tops of a pair of contact columns, introducing into the top of one of said columns said hot gaseous mixture, withdrawing from the bottom of said one column the pebbles and gas mixture cooled to a temperature between the condensation temperature of $FeCl_3$ and 30° C. above the condensation temperature of $FeCl_3$, passing said cooled gas mixture into the bottom of the other column and upwardly therethrough thereby to condense $FeCl_3$ on the surfaces of pebbles flowing downwardly therein, withdrawing the residual gases stripped of $FeCl_3$ from the top of said other column at a temperature above the condensation temperature of $TiCl_4$, withdrawing pebbles with condensed $FeCl_3$ from the bottom of said other column at a temperature below the condensation temperature of $FeCl_3$ and above the condensation temperature of $TiCl_4$, separating $FeCl_3$ from the pebbles by mechanical means, cooling said pebbles from said columns to a temperature above the condensation temperature of $TiCl_4$ and returning the cooled pebbles for reintroduction into said columns.

2. A method for the separation of $FeCl_2$ from a hot gaseous mixture of $FeCl_2$ and other gases including $TiCl_4$ which comprises; introducing pebbles of inert material cooled to a temperature above the condensation temperature of $TiCl_4$ into the tops of a pair of contact columns, introducing into the top of one of said columns said hot gaseous mixture, withdrawing from the bottom of said one column the pebbles and gas mixture cooled to a temperature between the condensation temperature of $FeCl_2$ and 30° C. above the condensation temperature of $FeCl_2$, passing said cooled gas mixture into the bottom of the other column and upwardly therethrough thereby to condense $FeCl_2$ on the surfaces of pebbles flowing downwardly therein, withdrawing the residual gases stripped of $FeCl_2$ from the top of said other column at a temperature above the condensation temperature of $TiCl_4$, withdrawing pebbles with condensed $FeCl_2$ from the bottom of said other column at a temperature below the condensation temperature of $FeCl_2$ and above the condensation temperature of $TiCl_4$, separating $FeCl_2$ from the pebbles by mechanical means, cooling said pebbles from said columns to a temperature above the condensation temperature of $TiCl_4$ and returning the cooled pebbles for reintroduction into said columns.

3. A method for the separation of $FeCl_3$ and $FeCl_2$ from a hot gaseous mixture of $FeCl_3$ and $FeCl_2$ and other gases including $TiCl_4$ which comprises; introducing pebbles of inert material cooled to a temperature above the condensation temperature of $TiCl_4$ into the tops of a pair of contact columns, introducing into the top of one of said columns said hot gaseous mixture, withdrawing from the bottom of said one column the pebbles and gas mixture cooled to a temperature between the condensation temperature of $FeCl_3$ and 30° C. above the condensation of $FeCl_3$, thereby to condense $FeCl_2$ on the surfaces of pebbles flowing downwardly therein, passing said cooled gas mixture into the bottom of the other column and upwardly therethrough thereby to condense $FeCl_3$ on the surfaces of pebbles flowing downwardly therein, withdrawing the residual gases stripped of $FeCl_3$ and $FeCl_2$ from the top of said other column at a temperature above the condensation temperature of $TiCl_4$, withdrawing pebbles with condensed $FeCl_3$ and $FeCl_2$ from the bottoms of said columns at a temperature below the condensation temperature of $FeCl_3$ and above the condensation temperature of $TiCl_4$, separating $FeCl_3$ and $FeCl_2$ from the pebbles by mechanical means, cooling said pebbles from said columns to a temperature above the condensation temperature of $TiCl_4$ and returning the cooled pebbles for reintroduction into said columns.

4. A method for the separation of iron chloride selected from the group consisting of $FeCl_3$, $FeCl_2$, and mixtures of $FeCl_3$ and $FeCl_2$, from a hot gaseous mixture of said iron chloride and other gases including $TiCl_4$ which comprises; introducing pebbles of inert material cooled to a temperature above the condensation temperature of $TiCl_4$ into the tops of a pair of contact columns, introducing into the top of one of said columns said hot gaseous mixture, withdrawing from the bottom of said one column the pebbles and gas mixture cooled to a temperature between the lowest condensation temperature of iron chloride present in said hot gaseous mixture and 30° C. above said lowest condensation temperature, passing said cooled gas mixture into the bottom of the other column and upwardly therethrough, thereby to condense iron chloride on the surfaces of pebbles flowing downwardly therein, withdrawing the residual gases stripped of iron chloride from the top of said other column at a temperature above the condensation temperature of $TiCl_4$, withdrawing pebbles with condensed iron chloride from the bottoms of said columns at a temperature below the condensation temperature of the iron chloride condensed and above the condensation temperature of $TiCl_4$, separating iron chloride from the pebbles by mechanical means, cooling said pebbles from said columns to a temperature above the condensation temperature of $TiCl_4$ and returning the cooled pebbles for re-introduction into said columns.

References Cited in the file of this patent

UNITED STATES PATENTS

| | | |
|---|---|---|
| 2,580,635 | Winter | Jan. 1, 1952 |
| 2,755,887 | Boatright | July 24, 1956 |